United States Patent
Koyama et al.

(10) Patent No.: US 11,045,766 B2
(45) Date of Patent: Jun. 29, 2021

(54) REVERSE OSMOSIS SYSTEM

(71) Applicant: Sulzer Management AG, Winterthur (CH)

(72) Inventors: Marcos Koyama, Curitiba (BR); Philippe Paul DuPont, Winterthur (CH); Antonio de la Torre, Madrid (ES)

(73) Assignee: SULZER MANAGEMENT AG, Winterthur (CH)

( * ) Notice: Subject to any disclaimer, the term of this patent is extended or adjusted under 35 U.S.C. 154(b) by 490 days.

(21) Appl. No.: 14/854,135

(22) Filed: Sep. 15, 2015

(65) Prior Publication Data

US 2016/0089633 A1 Mar. 31, 2016

(30) Foreign Application Priority Data

Sep. 29, 2014 (EP) .................................... 14186806

(51) Int. Cl.
*B01D 61/04* (2006.01)
*B01D 61/06* (2006.01)
(Continued)

(52) U.S. Cl.
CPC ............. *B01D 61/06* (2013.01); *B01D 61/04* (2013.01); *B01D 61/08* (2013.01); *C02F 1/441* (2013.01);
(Continued)

(58) Field of Classification Search
CPC ...... B01D 37/00; B01D 61/00; B01D 61/002; B01D 61/005; B01D 61/02; B01D 61/022;
(Continued)

(56) References Cited

U.S. PATENT DOCUMENTS 3,726,618 A * 4/1973 Dicmas .................. F04D 9/005
415/11
4,680,109 A 7/1987 Yamada et al.
(Continued)

FOREIGN PATENT DOCUMENTS

| | | |
|---|---|---|
| CN | 102032194 A | 4/2011 |
| EP | 2 310 114 B1 | 4/2011 |
| FR | 2 902 669 A1 | 12/2007 |

OTHER PUBLICATIONS

Extended European Search Report dated Mar. 20, 2015 in EP Application No. 14186806.7, filed Sep. 29, 2014.
(Continued)

*Primary Examiner* — Joseph W Drodge
(74) *Attorney, Agent, or Firm* — Global IP Counselors, LLP

(57) ABSTRACT

A reverse osmosis system includes a membrane unit, an energy recovery device, high and low pressure inlet lines, and a concentrate line. The membrane unit has a membrane, an inlet for receiving a feed fluid, a permeate outlet for discharging a permeate fluid and a concentrate outlet for discharging a concentrate fluid. The energy recovering device has a turbine portion, a turbine inlet and a turbine outlet, a pump portion, a pump inlet and a pump outlet, a motor, and a motor control unit for controlling the motor. The low pressure inlet line is connected to the pump inlet for supplying the feed fluid at a low pressure. The high pressure inlet line connects the pump outlet with the inlet for supplying the feed fluid at a high pressure. The concentrate line connects the concentrate outlet with the turbine inlet for supplying the concentrate fluid to the turbine portion.

3 Claims, 3 Drawing Sheets

(51) Int. Cl.
*B01D 61/08* (2006.01)
*C02F 1/44* (2006.01)
*F04D 17/08* (2006.01)
*F04D 25/06* (2006.01)
*F04D 29/42* (2006.01)
*F03B 3/02* (2006.01)
*C02F 103/08* (2006.01)

(52) U.S. Cl.
CPC .............. *F03B 3/02* (2013.01); *F04D 17/08* (2013.01); *F04D 25/06* (2013.01); *F04D 29/4293* (2013.01); *B01D 2313/246* (2013.01); *C02F 2103/08* (2013.01); *C02F 2209/40* (2013.01); *C02F 2303/10* (2013.01); *Y02A 20/131* (2018.01); *Y02W 10/30* (2015.05)

(58) Field of Classification Search
CPC .... B01D 61/025; B01D 61/027; B01D 61/04; B01D 61/08; B01D 61/58; B01D 63/00; B01D 63/08; B01D 2311/02; B01D 2311/04; B01D 2311/06; B01D 2311/08; B01D 2311/2649; B01D 2315/00; B01D 2317/00; B01D 2317/02; B01D 2317/022; B01D 2317/025; B01D 2317/08; B01D 61/06; B01D 2313/243; B01D 2313/246; B01D 61/10; B01D 2311/14; C02F 1/441; C02F 1/442; C02F 1/444; C02F 1/445; C02F 9/00; C02F 2103/08; C02F 2201/00; C02F 2201/007; C02F 2301/00; C02F 2301/04; C02F 2301/08; C02F 2209/40; C02F 2303/10; C02F 2313/246; C02F 1/001; C02F 1/004; C02F 1/44; F03B 3/02; F04D 17/08; F04D 25/08; F04D 29/4293; F04D 13/02; F04D 13/04; F04D 13/06; F04D 13/0613; F04D 25/02; F04D 25/024; F04D 25/06; F04D 25/0606; F04D 25/064; F04D 29/40; Y02A 20/131; Y02W 10/30

USPC ....... 210/767, 790, 805, 252, 259, 294, 295, 210/321.6, 321.72, 321.75, 321.84, 322, 210/323.1, 348, 500.1, 500.21
See application file for complete search history.

(56) References Cited

U.S. PATENT DOCUMENTS

| | | | | |
|---|---|---|---|---|
| 4,973,408 | A | * | 11/1990 | Keefer .................. B01D 61/06 210/137 |
| 4,983,305 | A | * | 1/1991 | Oklejas ................ B01D 61/022 210/321.66 |
| 6,053,702 | A | * | 4/2000 | Sears .................. F04D 15/0072 417/26 |
| 6,139,740 | A | * | 10/2000 | Oklejas ................ B01D 61/022 210/321.66 |
| 8,691,086 | B2 | | 4/2014 | Oklejas, Jr. |
| 2010/0270237 | A1 | * | 10/2010 | Efraty .................. B01D 61/025 210/637 |
| 2012/0168378 | A1 | * | 7/2012 | Taniguchi ............. B01D 61/06 210/650 |
| 2012/0213632 | A1 | * | 8/2012 | Parry .................... F04D 13/08 415/208.1 |
| 2013/0277310 | A1 | * | 10/2013 | Okeljas, Jr. ............ B01D 61/06 210/652 |
| 2013/0341934 | A1 | * | 12/2013 | Kawanishi ................ F03D 9/25 290/1 A |
| 2015/0104332 | A1 | * | 4/2015 | Calonius .................. F15B 3/00 417/53 |
| 2015/0240655 | A1 | * | 8/2015 | Hunt ..................... B01D 61/06 415/1 |

OTHER PUBLICATIONS

Waheed A. Raja, et al., "Reverse Running Centrifugal Pumps as Hydraulic Power Recovery Turbines for Sewater Reverse Osmosis Systems", vol. 38, XP55174507, Nov. 1981, pp. 123-134.

* cited by examiner

REVERSE OSMOSIS SYSTEM

CROSS-REFERENCE TO RELATED APPLICATIONS

This application claims priority to EP Application No. 14186806.7, filed Sep. 29, 2014, the contents of which is hereby incorporated herein by reference.

BACKGROUND

1. Field of Invention

The invention relates to a reverse osmosis system having an energy recovery device, as well as the use of such a system. Furthermore and in particular the invention relates to an energy recovery device to be used in such a reverse osmosis system.

2. Background Information

Reverse osmosis systems are used for example for the treatment of water such as desalination of seawater or brackish water. In such systems a semipermeable membrane is used that can be passed by the water or the solvent but not by solutes like dissolved solids, molecules or ions. For reverse osmosis the membrane is supplied with a pressurized feed fluid for example seawater. Only the solvent for example the water can pass the membrane and will leave the membrane unit as permeate fluid for example fresh water. The remaining part of the feed fluid that does not pass through the membrane is discharged from the membrane unit as concentrate fluid for example brine. The feed fluid has to be supplied to the membrane with a high pressure to overcome the osmotic pressure.

Thus, reverse osmosis typically is a process where a pressurized feed fluid is required and the concentrate fluid leaving the membrane unit still has a considerably large residual pressure that enables to recover a part of the pressurizing energy as mechanical energy. In seawater desalination, for example, the required pressure of the feed fluid (seawater) may be from 45 bar to 75 bar depending among others on the salinity and the temperature of the seawater. The pressure in the fresh water (permeate fluid) may be between zero and three bars, the pressure in the brine (concentrate fluid) is typically between 2 and 5 bars less than the feed pressure, i.e. 40-73 bar.

To provide for the required high pressure in the feed fluid there is a need for at least one high pressure pump. To recover mechanical energy from the concentrate fluid or the brine, respectively, it is known to have a separate energy recovery device that can be a pressure exchanger or a combination of a turbine with a pump that is driven by the turbine, pressure exchanger or a combination of a turbine with a pump that is driven by the turbine, often referred to as turbo-charger.

A reverse osmosis system with energy recovery is known for example from U.S. Pat. No. 8,691,086. This system comprises a so-called hydraulic energy management integration system (HEMI) having a turbine portion, a pump portion and a motor which is controlled by a controller. The brine (concentrate fluid) leaving the membrane housing is fed to the turbine portion of the HEMI to drive the turbine portion which in turn drives the pump portion. The outlet of the pump portion is connected to the inlet of the membrane housing. The inlet of the pump portion is connected to the outlet of a high-pressure pump supplying the pump portion of the HEMI with the feed fluid. During the normal operating process of the system the required pressure of the feed fluid at the inlet of the membrane housing is generated by the combined action of the high-pressure pump and the pump portion of the HEMI.

SUMMARY

Based on that prior art it is an object of the invention to propose a different reverse osmosis system with an energy recovery device. The system shall be simple, in particular from the constructional aspect, as well as safe and reliable.

The subject matter of the invention satisfying this object is characterized by the features of the independent claims.

Thus, according to the invention a reverse osmosis system is proposed comprising a membrane unit for reverse osmosis and an energy recovery device, the membrane unit having a membrane, an inlet for receiving a feed fluid, a permeate outlet for discharging a permeate fluid and a concentrate outlet for discharging a concentrate fluid, the energy recovering device having a turbine portion with a turbine rotor, a turbine inlet and a turbine outlet, a pump portion with a pump rotor, a pump inlet and a pump outlet, a motor with a motor rotor, and a motor control unit for controlling the motor, wherein the turbine rotor, the pump rotor and the motor rotor are operatively connected by a torque-proof connection, further comprising a low pressure inlet line connected to the pump inlet for supplying the feed fluid at a low pressure to the pump portion, a high pressure inlet line connecting the pump outlet with the inlet of the membrane unit for supplying the feed fluid at a high pressure to the membrane unit and a concentrate line connecting the concentrate outlet with the turbine inlet for supplying the concentrate fluid to the turbine portion wherein the pump portion is the sole pump for pressurizing the feed fluid from the low pressure to the high pressure.

The system according to the invention integrates in a single equipment both the pumping function for generating the high pressure in the feed fluid as well as the energy recovery function, i.e. the system does not have a separate high-pressure pump or any other pressure generating device for pressurizing the feed fluid but uses only the pump portion of the energy recovery device to pressurize the feed fluid from a low pressure to the high pressure required for the reverse osmosis process. Compared to known systems this results in a considerable reduction of the complexity of the system. For example, since there is no separate high-pressure pump the number of connections may be reduced to four, namely two at the inlet and the outlet of the pump portion and two at the inlet and the outlet of the turbine portion. A conventional system with a separate high-pressure pump needs at least two more connections, namely for the inlet and the outlet of the high-pressure pump.

In addition, the overall constructional effort is considerably reduced which enables a very compact embodiment. Besides the absence of a separate high-pressure pump the pipework effort is reduced as well as the number of required valves. These reductions also reduce the risk of leakage and increase the reliability of the system. The capital costs of the system are reduced. Concurrently the system in accordance with the invention offers at least an equivalent if not a better energy balance or energy efficiency, respectively, as compared to known systems.

From the practical point of view it is preferred when the pump portion is designed as a centrifugal pump.

Preferably, the turbine portion is designed as a Francis turbine or as a reverse running centrifugal pump.

It is advantageous, when the pump portion is arranged between the motor and the turbine portion or when the turbine portion is arranged between the motor and the pump portion. Arranging the turbine portion and the pump portion adjacent to each other and the motor on one side of the combination of the pump portion and the turbine portion renders it possible to design the pump portion and the turbine portion as a constructional unit resulting in a very compact design.

According to a preferred embodiment of the system the pump portion is designed for rotational speeds of at least 4000 rounds per minute.

Depending upon the desired flow and pressure for the respective application it may be advantageous when the pump portion is designed for rotational speeds of at least 20000 rounds per minute.

In order to design the system in a very compact manner it is a preferred measure that the turbine portion, the pump portion and the motor are designed as a constructional unit.

According to a preferred embodiment of the invention the torque-proof connection between the turbine rotor, the pump rotor and the motor rotor is realized by the feature that the turbine rotor and the pump rotor are arranged on a common shaft that is coupled to the motor rotor. Most preferred, the common shaft does not comprise any coupling, nor any gear, nor any clutch between the turbine rotor and the pump rotor. The coupling of the common shaft to the motor rotor is designed as a conventional coupling for example a mechanical coupling. However there are other possibilities to provide for this torque-proof connection, for example by a magnetic coupling or by a combination of magnetically and mechanically couple the rotors. As an alternative the turbine rotor, the pump rotor and the motor rotor may be arranged on a common shaft. Preferably, the common shaft does not comprise any coupling or clutch.

It is preferred when the turbine portion and the pump portion are designed with a common casing, in which the turbine rotor and the pump rotor are arranged directly adjacent to each other. The pump rotor and the turbine rotor are arranged on a common shaft very close to each other. In particular, the common shaft does not comprise any coupling or any clutch between the turbine rotor and the pump rotor. This arrangement enables a very compact and space saving design.

In order to control the flow of the permeate fluid it is preferred to provide a first valve arranged and designed to control the flow of the permeate fluid downstream of the permeate outlet.

In order to control the flow of the concentrate fluid it is preferred to provide a second valve arranged and designed to control the flow of the concentrate fluid downstream of the turbine outlet.

In order to minimize the constructional effort of the reverse osmosis system it may be advantageous when the flow connection between the concentrate outlet of the membrane unit and the turbine inlet is free of control valves.

In a preferred embodiment of the reverse osmosis system the pump portion and the turbine portion are horizontally arranged to each other.

As an alternative and depending on the specific application it may be advantageous when the pump portion and the turbine portion are vertically arranged to each other.

In order to prevent the energy recovery device and the membrane unit from degradation or damages it may be advantageous to provide a pretreatment unit for purifying the feed fluid arranged upstream of the pump inlet and being in flow communication with the pump inlet. The pretreatment unit may comprise filters for removing sand, grit or other solid substances or materials from the feed fluid.

A preferred use of a reverse osmosis system according to the invention is the desalination of water, in particular seawater.

Another preferred use is the treatment of brackish water.

Still another preferred use is the treatment of any fluid by reverse osmosis.

According to the invention there is also proposed an energy recovery device for a reverse osmosis system having a membrane unit with a membrane, an inlet for receiving a feed fluid and a concentrate outlet for discharging a concentrate fluid, said energy recovering device having a turbine portion with a turbine rotor, a turbine inlet and a turbine outlet, a pump portion with a pump rotor, a pump inlet and a pump outlet, a motor with a motor rotor, and a motor control unit for controlling the motor, wherein the turbine rotor, the pump rotor and the motor rotor are operatively connected by a torque-proof connection, the pump inlet being adapted to receive the feed fluid at a low pressure from a low pressure inlet line, the pump outlet being adapted for supplying the feed fluid at a high pressure to the membrane unit, and the turbine inlet being adapted for receiving the concentrate fluid from the membrane unit and wherein the pump portion is designed for pressurizing the feed fluid from the low pressure to the high pressure.

Thus, the energy recovery device according to the invention is designed and adapted such that the pump portion of the energy recovery device is used as the sole pump for pressurizing the feed fluid from the low pressure to the high pressure that is required for performing the reverse osmosis. There is no need for any additional high pressure pump supporting the action of the pump portion of the energy recovery device to generate the high pressure. In addition there is no need for any other pressure generating device, to pressurize the feed fluid from the low pressure to the high pressure.

The advantages and the preferred measures as well as the preferred embodiments are the same as already explained in connection with the reverse osmosis system.

In particular it is preferred when the pump portion is designed as a centrifugal pump and when the turbine portion is designed as a Francis turbine or as a reverse running centrifugal pump.

According to a preferred embodiment of the energy recovery system the turbine portion and the pump portion are designed with a common casing, in which the turbine rotor and the pump rotor are arranged directly adjacent to each other on a common shaft that is coupled to the motor rotor. The common shaft does not comprise any coupling or any clutch or any gear between the turbine rotor and the pump rotor. This arrangement enables a very compact and space saving design.

Further advantageous measures and embodiments of the invention will become apparent from the dependent claims.

BRIEF DESCRIPTION OF THE DRAWINGS

The invention will be explained in more detail hereinafter with reference to the drawings. There are shown in a schematic representation.

DETAILED DESCRIPTION OF THE EMBODIMENTS

Figure 1:
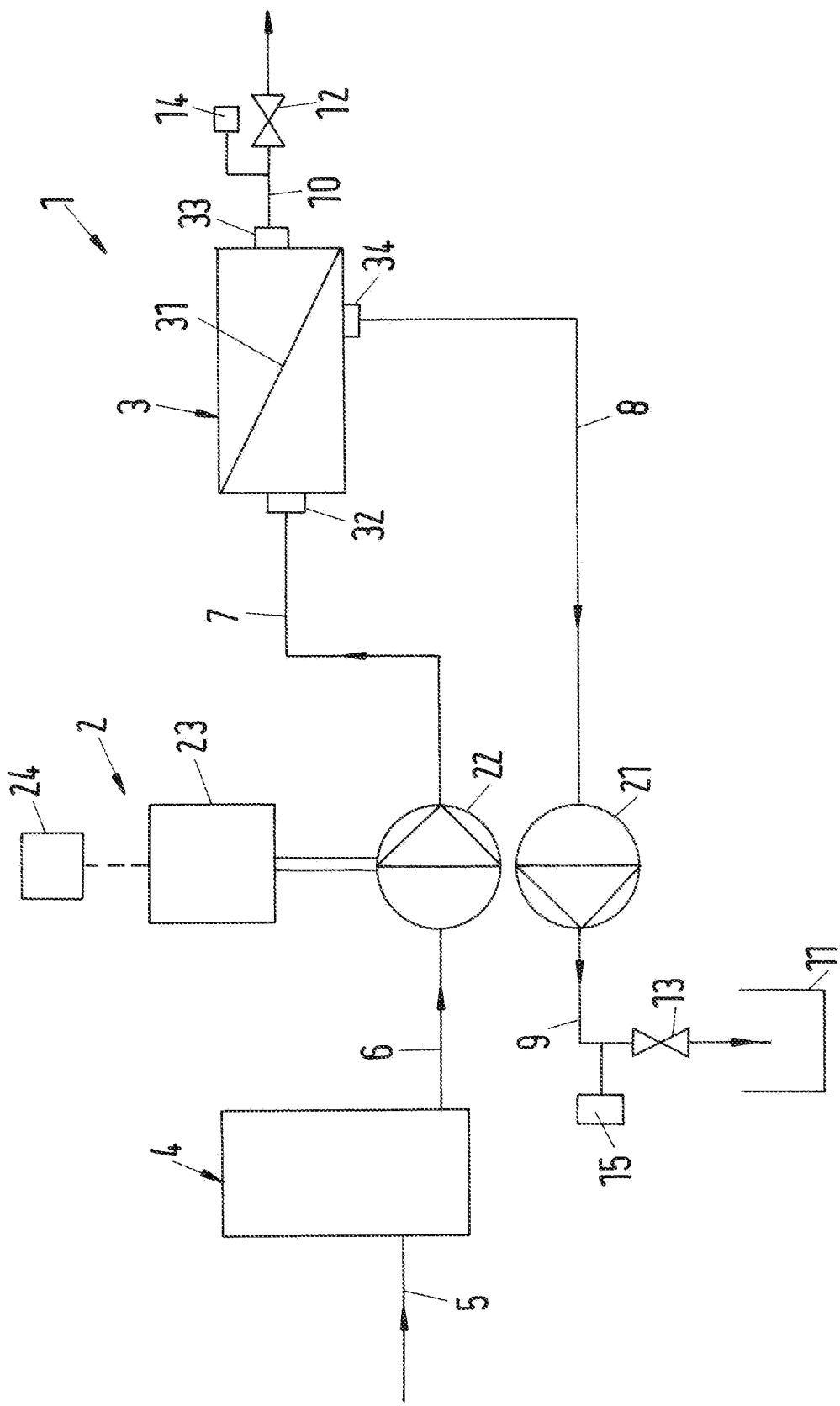
FIG. 1 is a schematic view of an embodiment of a reverse osmosis system according to the invention.

FIG. 1 shows a schematic view of an embodiment of a reverse osmosis system according to the invention which is designated in its entity with reference numeral 1. The reverse osmosis system 1 comprises a membrane unit 3 having a membrane 31 for performing the reverse osmosis process. The membrane unit 3 has an inlet 32 for receiving a feed fluid, a permeate outlet 33 for discharging a permeate fluid and a concentrate outlet 34 for discharging a concentrate fluid. In a reverse osmosis process the membrane unit 3 is supplied with the feed fluid comprising a solvent, for example water, and solutes like dissolved solids, molecules or ions. Essentially only the solvent can pass the membrane 31 and will leave the membrane unit 3 as the permeate fluid, for example fresh water. The remaining part of the feed fluid is discharged from the membrane unit as the concentrate fluid. The feed fluid has to be supplied to the membrane 31 with a high pressure being high enough to overcome the osmotic pressure. Therefore the concentrate leaving the membrane unit 3 is typically still under quite a high residual pressure which may be up to 95% of the feed pressure, i.e. the high pressure under which the feed fluid is supplied to the membrane unit 3. This residual pressure of the concentrate fluid enables to recover part of the pressurizing energy as mechanical energy. For this purpose the reverse osmosis system 1 comprises an energy recovery system which is designated in its entity with reference numeral 2 and which is illustrated in more detail in FIG. 2.

In the following description of the preferred embodiment reference is made to the important practical application that the reverse osmosis system 1 is used for the desalination of seawater. In such an application the feed fluid supplied to the membrane unit 3 is seawater, the permeate fluid is fresh water and the concentrate fluid is brine. However, the invention is not restricted to the desalination of seawater, it is also suited for other applications like treatment of water in general, purification of water or treatment of brackish water. Furthermore, the reverse osmosis system according to the invention may be used for all reverse osmosis processes in which the concentrate fluid has a residual pressure being high enough for the recovery of energy. One example is the treatment or hydrotreatment of hydrocarbons in refineries.

As already mentioned the reverse osmosis system 1 comprises the energy recovery device 2. The energy recovery device 2 comprises a turbine portion 21 having a turbine rotor 211, a pump portion 22 having a pump rotor 221, a motor 23 having a motor rotor 231 and a control unit 24 for the motor 23. The turbine rotor 211, the pump rotor 221 and the motor rotor 231 are operatively connected by a torque-proof connection. In the described preferred embodiment the torque-proof connection is realized by arranging the pump rotor 221 and the turbine rotor 211 on a common shaft 26 that is coupled to an motor shaft 25 on which the motor rotor 231 is mounted. The common shaft 26 does not comprise any couplings, clutches or gears between the pump rotor 221 and the turbine rotor 211. The coupling of the common shaft 26 and the motor shaft 25 may be a conventional mechanical coupling that is known in the art. Thus, the common shaft 25 is driven by the motor rotor 231 such that all the three rotors are coupled rigidly to each other and rotate synchronously. However, the torque-proof connection of the three rotors 211, 221 and 231 may be realized in different manners, for example by a magnetic coupling or by other mechanical couplings or by a combination of mechanical and magnetic couplings. As an alternative the three rotors 211, 221, 231, namely the pump rotor 221, the turbine rotor 211 and the motor rotor 231 may be arranged on a single common shaft, i.e. the shaft 26 and the motor shaft 25 are designed as a single common shaft.

The combination of the turbine part 21 and the pump part 22 is sometimes referred to as a turbo-charger. In this embodiment the pump portion 22 and the turbine portion 21 are arranged vertically to each other, i.e. with respect to the direction of gravity the pump portion 22 is arranged on top of the turbine part or, alternatively the turbine part 21 may be arranged on top of the pump part 22. As a further alternative the turbine portion 21 and the pump portion 22 may be arranged horizontally (see FIG. 3).

According to the preferred embodiment of the system 1 the turbine portion 21, the pump portion 22 and the motor 23 are designed as a constructional unit. By this measure a very compact, space-saving and reliable design of the energy recovery device 2 is realized.

A further preferred measure is designing the turbine portion 21 and the pump portion 22 with a common casing 20 in which both the turbine rotor 211 and the pump rotor 221 are arranged adjacent to each other. The distance between the turbine rotor 211 and the pump rotor 221 is small to enable a compact and space saving design of the common housing 20.

The pump portion 22 of the energy recovery device 2 comprises a pump inlet 222 for supplying the feed fluid i.e. the seawater to the pump portion 22 and a pump outlet 223 for discharging the pressurized feed fluid from the pump portion 22. Preferably, the pump portion 22 is designed as a centrifugal pump. It may be a single stage pump or a multistage pump. Furthermore, the pump portion 22 is designed for very high rotational speeds of at least 4000 rounds per minute (rpm), and more preferably for at least 20000 rpm. In this embodiment the pump portion 22 is a high-speed pump or turbo-pump. The high rotational speed of the pump portion 22 enables the creation of a high pressure in the feed fluid as required by the reverse osmosis process.

Furthermore, the high rotational speed together with arranging the pump rotor 221 and the turbine rotor 211 on the same common shaft 26 results in a higher efficiency and thus in a higher amount of energy that can be recovered.

In addition, the high rotational speed renders possible to use smaller vanes for the pump rotor 221 as compared to a rotor turning at a lower speed and creating the same pressure. This is advantageous in view of a compact design.

The turbine part 21 of the energy recovery unit 2 comprises a turbine inlet 212 for receiving the concentrate fluid, i.e. the brine that is discharged from the membrane unit 3 and a turbine outlet 213 for discharging the concentrate fluid from the turbine part 2. The turbine rotor 211 is preferably designed as a centrifugal rotor. Most preferred the turbine portion 21 is designed as a Francis turbine or as a reverse running centrifugal pump.

The motor 3, preferably a high speed electric motor, is adapted for the same high rotational speed as the pump rotor 221 that usually exceeds multiple times the synchronous speed given by the product of the pole pair number and the frequency of the driving current. Preferably the motor control unit 24 comprises a variable-frequency drive (VFD) which is per se known in the art.

The reverse osmosis system 1 optionally comprises a pretreatment unit for the pretreatment of the feed fluid, here the seawater. The pretreatment may be a chemical treatment, a disinfection treatment, separation treatments based on different filtration types like sand filters, cartridge filters, ultrafiltration and so on or combinations of such treatments. In the case of seawater as the feed fluid the pretreatment unit 4 should remove impurities, solid particles and biological life which could damages especially the membrane 31. Of course the pretreatment unit 4 may comprise at least one pump (not shown) or other means or device for conveying or moving the feed fluid through the pretreatment unit 4.

The components of the embodiment of the reverse osmosis system1 are connected to each other in the following manner: The seawater as feed fluid is supplied to the pretreatment unit 4 by a supply line 5. The outlet of the pretreatment unit 4 is connected to the pump inlet 222 by a low pressure inlet line 6 through which the pretreated feed fluid is supplied to the pump part 22. Thus, the low pressure inlet line 6 provides the flow communication between the pretreatment unit 4 and the pump inlet 222. The pump outlet 223 is connected to the inlet 32 of the membrane unit 3 by a high pressure inlet line 7 for supplying the feed fluid to the membrane unit 3. The concentrate outlet 34 of the membrane unit 3 is connected to the turbine inlet 212 by a concentrate line 8 for supplying the concentrate, i.e. the brine, discharged from the membrane unit 3 to the turbine portion 21. The turbine outlet 213 is connected to a drain line 9 for discharging the concentrate fluid from the turbine part 21 to a drain 11. In addition, the permeate outlet 33 of the membrane unit 3 is connected to a permeate line 10 for discharging the permeate, i.e. the fresh water from the membrane unit 3.

In order to control the flows or the flow balance in the system 1 the embodiment of the reverse osmosis system 1 comprises at least two control valves, namely a first valve 12 arranged in the permeate line 10 downstream of the permeate outlet 33 to control the flow of the permeate, i.e. the fresh water and a second valve 13 arranged in the drain line 9 downstream of the turbine outlet 213 to control the flow of the concentrate fluid (brine) to the drain 11. The first and the second valve 12 and 13 may be combined each with a flowmeter for the measurement of the flow through the respective valve 12 or 13 or there might be separate flowmeters, namely a first flowmeter 14 and a second flowmeter 15 just upstream of the first and the second valve 12, 13, respectively.

It goes without saying that there may be additional valves or additional flowmeters to control or to measure the flow at different locations in the reverse osmosis system 1. Such measures per see are known in the art and do not need any further explanation.

In addition, the reverse osmosis system 1 may comprise several pressure sensors to determine the pressure of the fluid at different locations in the system. These pressure sensors are not shown in the drawings. For example there may be a pressure sensor in the supply line 5 and/or in the low pressure inlet line 6 and/or in the high pressure inlet line 7 and/or in the concentrate line 8 and/or in the drain line 9 and/or in the permeate line 10 or at other locations. In addition, there may be temperature sensors or other sensors to determine the respective property of the fluid at different locations in the system 1. The signals of the pressure sensors and the other sensors as well as the signals of the flowmeters 14, 15 are communicated to a control unit that may be a separate unit (not shown) or may be integrated in the motor control unit 24. The signals of the different sensors and flowmeters 14, 15 are used to determine control parameters which in turn are used to set or to control the rotational speed of the motor 3 as indicated by the dashed line in FIG. 1—and to control the valves 12 and 13 such that the desired flow and pressure in the system is realized.

It is preferred that the flow connection between the concentrate outlet 34 of the membrane unit 3 and the turbine inlet 212 is free of control valves. Thus, in the described embodiment there is no valve in the concentrate line 8.

The reverse osmosis system 1 operates in the following manner: The seawater (feed fluid) is supplied through the supply line 5 to the pretreatment unit 4 where it is pretreated, for example purified by removing solid particles and biological material. After leaving the pretreatment unit 4 the seawater is at a low pressure with which it is delivered to the pump inlet 222 of the pump part 22 of the energy recovery device 2. The term "low pressure" means that the feed fluid is not considerably pressurized above ambient pressure. Of course, there has to be a certain pressure to move the feed fluid (seawater) through the pretreatment unit 4. Thus, the feed fluid will be at a pressure slightly higher than ambient pressure if there is a pretreatment unit 4. The suction pressure at the pump inlet 222 of the pump portion 22 is usually 2 bars or 3 bars or 4 bars depending on the specific application. These pressures are considered as "low pressure" within the meaning of this specification. Especially, the term "low pressure" comprises the pressure values at which the feed fluid is usually discharged from the pretreatment unit 4 or the suction pressure at which the feed fluid is delivered to the pump providing the high pressure. "Low pressure" may also mean ambient pressure.

The pump part 22 with the pump rotor 221 pressurizes the feed fluid from the low pressure to a high pressure being the pressure at which the feed fluid (seawater) is supplied to the membrane unit 3. The term "high pressure" means a pressure that is high enough to overcome the osmotic pressure and to perform the reverse osmosis process in an efficient manner. The value of the high pressure depends on the specific application. For the desalination of seawater the high pressure at which the seawater is supplied to the membrane unit 3 depends on several factors for example the salinity and the temperature of the seawater. Typical values for the high pressure used in the desalination of seawater range from 45 bar to 75 bar.

According to the invention the pump portion 22 of the energy recovery device 2 is the sole pump for pressurizing the feed fluid from the low pressure to the high pressure. Different from known reverse osmosis systems using both a high pressure pump and a separate energy recovery device the system 1 according to the invention integrates the high pressure pumping function and the energy recovery function in a single unit, namely the energy recovery system 2. Advantages of this measure are the reduction in the number of connections, the reduction of the pipework effort and the reduction in the number of valves required. This results in a reduced risk of leakage, increased liability and reduced costs of the system 1.

The pressurized feed fluid (seawater) leaves the pump portion 22 at the pump outlet 223 passes through the high pressure inlet line 7 to the inlet 32 and is supplied to the membrane unit 3 with the high pressure. The fresh water (permeate) leaves the membrane unit 3 through the permeate outlet 33 and the permeate line 10. For the application of seawater desalination typical values for the permeate pressure (pressure of the permeate at the permeate outlet) range from 0 bar to 3 bar. A typical value for the permeate fluid flow is about 45% of the feed fluid flow.

The concentrate, i.e. the brine, is discharged from the membrane unit 3 through the concentrate outlet 34 and passes through the concentrate line 8 to the turbine inlet 212 of the turbine portion 21. For seawater desalination the brine pressure (pressure of the concentrate at the concentrate outlet 34) is typically about 95% of the high pressure or 2 bar to 5 bar below the high pressure with which the feed fluid is fed to the membrane unit 3, thus it usually ranges from 40 bar to 73 bar. A typical value for the concentrate fluid (brine) flow is about 55% of the feed fluid flow.

The pressurized brine drives the turbine rotor 211 and is discharged from the turbine portion 21 through the turbine outlet 213 and the drain line 9 to the drain 11. By this driving action of the pressurized brine energy is recovered that is used to drive the pump rotor 221 of the pump portion 22.

The flow balance in the system 1 is controlled by the first valve 12 being arranged in the permeate line 10 and the second valve 13 being arranged in the drain line 9. These valves 12 and 13 are controlled on the basis of the flows that are measured by the flowmeters.

The rotational speed of the pump rotor 221 and the turbine rotor 211 is always set by the motor 23. Depending on the signals delivered by the different sensors (not shown) and/or the flowmeters 14, 15 the control unit 24 determines the desired rotational speed for the motor 23 and controls the motor 23 accordingly.

Figure 2:
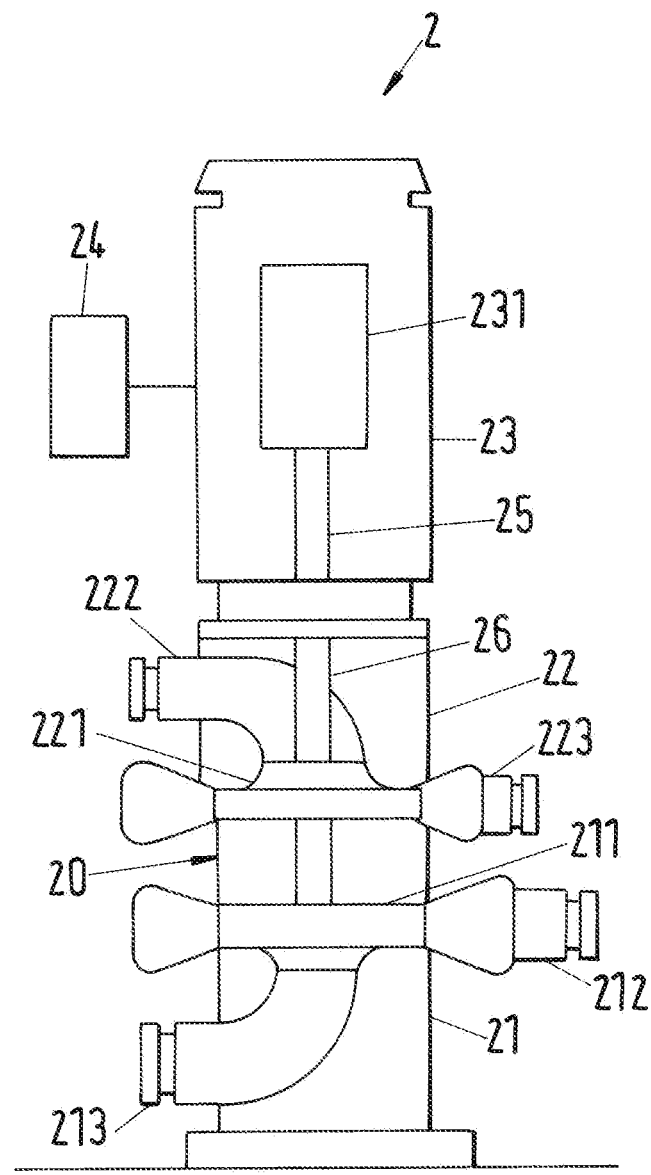
FIG. 2 is a more detailed schematic view of the energy recovery system of the embodiment shown in FIG. 1.
Figure 3:
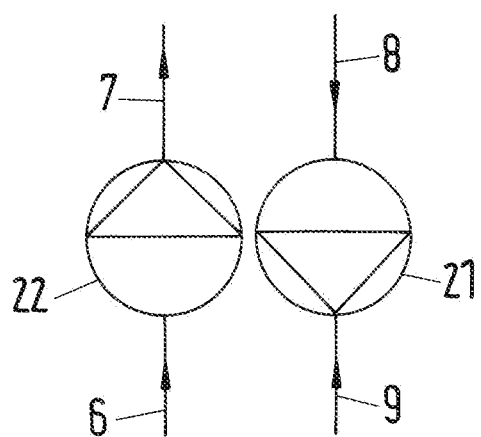
FIG. 3 is a schematic view of an alternative for the arrangement of the pump portion and the turbine portion of the energy recovery device.

FIG. 3 shows a schematic view of an alternative for the arrangement of the pump portion 22 and the turbine portion 21 of the energy recovery device 2. According to this alternative the pump portion 22 and the turbine portion 21 are horizontally arranged to each other. That means the pump portion 22 and the turbine portion 21 are arranged side by side with respect to the horizontal direction, which is the direction perpendicular to the direction of gravity. All the other explanations made in connection with the embodiment illustrated in FIG. 1 and FIG. 2 are also valid in the same or in an equivalent manner for the alternative shown in FIG. 3.

The invention claimed is:

1. A method comprising: providing a reverse osmosis system comprising:
    a membrane unit for reverse osmosis,
    an energy recovery device,
    a low pressure inlet line,
    a high pressure inlet line,
    a fluid supply line;
    a pretreatment unit directly connected to the fluid supply line, the pretreatment unit being a chemical treatment unit, disinfection treatment unit or a separation treatment unit, and having a single outlet directly connected to the low pressure inlet line; and
    a concentrate line,
    the membrane unit having a membrane, an inlet configured to receive a pretreated feed fluid from the single outlet, a permeate outlet configured to discharge a permeate fluid, and a concentrate outlet configured to discharge a concentrate fluid, the energy recovering device having a turbine portion with a turbine rotor, a turbine inlet, and a turbine outlet, a pump portion with a pump rotor, a pump inlet and a pump outlet, a motor with a motor rotor, and a motor control unit programmed to control the motor, the pump portion being a first pump in the reverse osmosis system, and the turbine portion, the pump portion and the motor being a constructional unit with the turbine portion arranged vertically with respect to the pump portion,
    the turbine rotor, the pump rotor and the motor rotor are operatively connected by a torque-proof connection,
    the low pressure inlet line being connected to the pump inlet upstream of the inlet of the membrane unit, and carrying the pretreated feed fluid at a low pressure of less than 4 bars to the pump portion, the high pressure inlet line connecting the pump outlet with the inlet of the membrane unit, and supplying the pretreated feed fluid at a high pressure of at least 45 bar to the membrane unit, the concentrate line connecting the concentrate outlet with the turbine inlet, and being configured to supply concentrate fluid to the turbine portion, the pump portion being the sole pump to pressurize the pretreated feed fluid from the low pressure to the high pressure; and
    operating the reverse osmosis system to treat the fluid by reverse osmosis, the fluid optionally being seawater or brackish water.

2. A method in accordance with claim 1, wherein the fluid is seawater, and operating the reverse osmosis system includes operating the reverse osmosis system to desalinate the seawater.

3. A method in accordance with claim 1, wherein the separation treatment unit is a sand filter, a cartridge filter or an ultrafiltration unit.

* * * * *